United States Patent Office 2,989,513
Patented June 20, 1961

2,989,513
CURING OF RUBBER WITH A SULFUR-OLEFINIC HYDROCARBON INTERPOLYMER, AND PRODUCT OBTAINED THEREBY
Charles Malcolm Hendry and David Craig, Cuyahoga Falls, Ohio, assignors to The B. F. Goodrich Company, New York, N.Y., a corporation of New York
No Drawing. Filed Dec. 15, 1958, Ser. No. 780,200
12 Claims. (Cl. 260—79)

This invention relates to novel rubber vulcanizates and more particularly pertains to cured compositions comprising rubber and an interpolymer of sulfur and an olefinic compound and to the method for preparing said compositions.

Rubber vulcanizates prepared in the past with conventional curing agents, such as elemental sulfur, have often exhibited poor aging properties, especially at elevated temperatures. Many previously known rubber vulcanizates become more highly cross-linked and less rubbery when subjected to elevated temperatures for relatively short periods of time. Many of the conventional curing agents of the prior art when compounded into rubber stocks show a tendency to migrate to the surface when said stocks are stored prior to the fabrication and vulcanization operations. The migration of a curing agent to the surface of a rubber stock or "blooming" of the curing agent is generally accompanied by an undesirable marked decrease in tack at the surface. The physical properties of rubber vulcanizates prepared with conventional curing agents often will vary over wide ranges because of experimentally uncontrollable variations in the levels of curing agents used in the compounding operation. It has also been observed prior to this invention that the curing cycles required for the preparation of rubber vulcanizates are often so drastic that some unavoidable overcure of the vulcanized product often will occur, at the surface of the vulcanizate, particularly during the cure of thick rubber articles.

Accordingly, an object of this invention is the provision of novel rubber vulcanizates which exhibit excellent aging properties at elevated temperatures. Another object is the provision of rubber stocks which can be stored for prolonged periods of time prior to the curing operation without noticeable blooming of the curing agent and without noticeable loss in building tack in the stock. Another object is the provision of rubber stocks which can be cured to vulcanizates having constant physical properties over a wide range of curing agent levels. Another object is the provision of rubber stocks having constant physical properties over a wide range of curing periods.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

We have discovered a novel rubber vulcanizate composition comprising a major proportion of a rubber and a minor proportion of a curing agent comprising an interpolymer of sulfur and an olefinic compound.

The rubbers useful as ingredients in the vulcanizates of this invention include, but are not limited to, rubbery materials having available unsaturation, such as natural and synthetic vulcanizable rubbers and the rubbery polymers of dienes, preferably of open-chain conjugated dienes having from 4 to 8 carbon atoms. Specific examples of rubbery materials useful in this invention are natural rubber, which is essentially a polymer of isoprene, polybutadiene-1,3, polyisoprene, poly-2,3-dimethyl-butadiene-1,3, poly-2-chlorobutadiene-1,3 and the like, the "synthetic natural" rubbers such as cis-1,4 head-to-tail polyisoprene and other polymers obtained from 1,3-dienes by means of directive polymerization, or the rubbery copolymers, terpolymers, and the like of these and similar conjugated dienes with each other or with at least one copolymerizable monomer such as isobutylene, styrene, acrylonitrile, methyl acrylate, ethyl acrylate, butyl acrylate, methyl methacrylate, 2-vinyl pyridine, 4-vinyl pyridine, and the like. The polymeric diene rubbers generally contain at least 50% by weight of the diene and preferably contain from about 55 to 85% by weight of the diene. However, copolymers, terpolymers and other multicomponent polymers containing as little as 35% or less by weight of diene can also be employed. For example, polymers of about 35% by weight of butadiene-1,3, about 35% styrene and about 30% acrylonitrile, polymers of about 67% by weight of butadiene-1,3 and about 33% acrylonitrile, and polymers of about 97% isobutylene and about 3% isoprene can be used. For the purposes of this invention balata and gutta percha, which are polyisoprene isomers, and the like which contain available unsaturation are to be considered as curable rubbers.

Still other rubbery materials can be used in the practice of this invention such as unsaturated polymers containing acid groups obtained by the copolymerization of a major amount of an open-chain aliphatic conjugated diene with an olefinically unsaturated carboxylic acid, by the reaction of a polymer of a diene with a carboxyl supplying reagent preferably in the presence of a catalyst, by the copolymerization of a diene with an olefinically unsaturated copolymerizable compound hydrolyzable to form an acid group and by copolymerization of an alkyl ester of an acrylic type acid with a polyolefinically unsaturated carboxylic acid. Still other rubbers can be employed such as polymers formed by the copolymerization of dienes with alkyl acrylates and by the polymerization of an alkyl acrylate with at least one other polyolefinically unsaturated monomer followed by hydrolysis.

Rubbery polyesterurethanes, polyetherurethanes and polyesteramideurethanes having curable double bonds or available unsaturation and rubber reclaimed from the foregoing can also be used. Mixtures of two or more of the foregoing rubbers may be employed as ingredients in the vulcanizates of this invention. The preferred rubbers are the natural and synthetic polyisoprenes, the polybutadienes, the polychloroprenes, and the copolymers of isobutylene with isoprene, butadiene-1,3 with styrene, and butadiene-1,3 with acrylonitrile.

The curing agents embodied in the present invention comprise interpolymers of sulfur and one or more olefinic compounds. The most useful olefinic compounds for the purposes of this invention are the olefinic hydrocarbons and the olefinic esters, acids, halides, nitriles, ketones, anhydrides, aldehydes, and ethers. The preferred curing agents are interpolymers of sulfur and one or more olefinic hydrocarbons. The interpolymers which are most useful in this invention include those having ratios of from 1:2 to about 1:5 of olefinic equivalents to sulfur atoms. For the purposes of this invention an olefinic equivalent is the number arrived at when the molecular weight of a given olefinic compound is divided by the number of non-benzenoid olefinic double bonds present in said olefinic compound.

Specific olefinic compounds which are useful in the present invention include, but are not limited to, olefinic hydrocarbons including the alkenes, such as ethylene, propylene, butene-1, butene-2, isobutylene, isopentene, diisobutylene, triisobutylene, hexene-1, heptene-3, octene-1, dodecene-8, cetene-1, hexyl-2-decene-1, heptadecene-7, pentatriacontene-17, cycloalkenes such as cyclopentene, cyclohexene, unsaturated terpenes such as pinene, camphene, alloocimene, myrcene, and squalene; aralkenes such as styrene, dihydronaphthalene, indene, acenaphthalene, alpha-methyl styrene; polyolefins such as allene, butadiene, isoprene, chloroprene, cyclopentadiene, vinyl cyclopentadiene, cyclohexadiene, vinyl cyclohexene, divinyl acetylene, divinyl benzene, trivinyl benzene, hexatriene, diallyl dimethallyl, 1,6-heptadiene, 1,7-octadiene, 1,8-nonadiene, 1,4-heptadiene, and the like, triolefin monovinyl acetylene, and others.

Other olefinic compound-sulfur reaction products which can be used include methyl methacrylate, ethyl acrylate, acrylic acid, methacrylic acid, vinyl acetate, vinyl chloride, acrylonitrile, methyl vinyl ketone, diethyl tetrahydrophthalate, tetrahydrophthalic anhydride, oleic acid, undecylenic acid, crotonic acid, cinnamic acid, croton aldehyde, methyl vinyl ether, and the like and others. The preferred olefinic compounds are the monoolefinic hydrocarbons including styrene, alpha-methyl styrene, butene-1, butene-2, isobutylene, diisobutylene, triisobutylene, ethylene and propylene.

Elemental sulfur is preferred for use in preparing the curing agents, however, other sulfurizing agents containing at least two sulfur atoms per molecule such as sodium polysulfide, diethyl tetrasulfide, hydrogen disulfide and sulfur monohalides such as sulfur monochloride may be used. Catalysts may be employed to facilitate the polymerization of the sulfur-olefinic hydrocarbon mixture although they are not necessary. The polymerization reaction can be carried out in an inert diluent such as benzene, toluene, chlorobenzene, carbon disulfide, and the like or the reaction can be conducted in the absence of a diluent.

The sulfur-olefinic hydrocarbon polymer curing agents are prepared at temperatures in the range of from about 100° C. and lower to about 180° C. and higher and preferably from about 145° C. to about 160° C.

The vulcanizates of this invention comprise as essential ingredients a major proportion of a single rubbery material or a mixture of two or more rubbery materials as herein described and a minor proportion of a single or a mixture of sulfur-olefinic compound polymer curing agents. Other appropriate compounding ingredients such as reinforcing agents, fillers, accelerators, plasticizers, antioxidants, age resistors, resins, dyes, color pigments, fungicides, and the like may be employed with the rubbery compositions disclosed herein in the amounts customarily employed in the rubber industry depending upon the ultimate use of the product. The curing agents of this invention are useful in the range of from about 1 to about 12 parts by weight per one hundred parts by weight of the rubbery material and the preferred range is from about 1.0 to about 4 parts by weight per one hundred parts of rubbery material. The rubber stocks containing the curing agent and other appropriate compounding ingredients are mixed on the mill or in any other suitable mixing device and the resulting blends are cured at temperatures of from about 250° F. to about 350° F. and preferably at from about 260° F. to about 320° F.

The vulcanizates of the present invention are useful in tire treads, tire sidewalls, carcass stocks, V-belts, gloves, shoe heels, shoe soles, printing rollers, cutless bearings, colored rubbery articles and wherever it is desired to provide a stable elastomer.

In the following illustrative examples the amounts of ingredients are given in parts by weight unless otherwise specified.

Example I

A mixture of 104 g. of styrene and 128 g. of sulfur was heated in an enclosed apparatus at a temperature of from about 150° to 157° C. for about 30 minutes at which time refluxing had stopped essentially. The resulting viscous liquid was held at the same temperature for an additional 30 minutes and the product was vacuum stripped of volatile materials. The resulting styrene-sulfur polymer was a viscous brown liquid at room temperature having a ratio of 1 mole of styrene to 4 atoms of sulfur as determined by elemental sulfur analysis. In a similar manner styrene-sulfur polymers containing ratios of moles of styrene to atoms of sulfur of 1:2.8 and 1:4.5 were prepared. The use of from 10 to 20% by weight of dipentene or alpha-methyl styrene with styrene in the preparation of the polymer causes the formation of a more fluid product.

Three natural rubber stocks (A, B and C) were prepared by employing the following recipes:

|  | A | B | C |
|---|---|---|---|
| Pale crepe | 100 | 100 | 100 |
| Zinc oxide | 5 | 5 | 5 |
| Stearic acid | 3 | 3 | 3 |
| Carbon black (furnace HAF) | 50 | 50 | 50 |
| 2-Benzothiazyl-N-morpholinyl disulfide | 1 | 1 | 1 |
| Styrene-sulfur polymer, 1:2.8 | 5 | | |
| Styrene-sulfur polymer, 1:4.5 | | 3 | |
| Styrene-sulfur polymer, 1:4 | | | 3 |

Stress-strain and aging data for recipes A, B and C cured at 284° F. for 50 minutes follow:

|  | 300% Modulus, p.s.i. | Tensile, p.s.i. | Percent Elongation |
|---|---|---|---|
| A | 2,440 | 4,370 | 500 |
| B | 2,340 | 4,430 | 540 |
| C | 2,480 | 4,570 | 525 |

AFTER AGING 48 HOURS AT 212° F. IN A TEST TUBE

|  |  |  |  |
|---|---|---|---|
| B | 3,770 | 3,950 | 430 |

A natural rubber-sulfur vulcanizate of the above type decreased in elongation from 505% to 300% upon aging for 48 hours at 212° F. in a test tube. The marked decrease in elongation for the sulfur-cured natural rubber indicates that considerable post-cure cross-linking has taken place.

Example II

In accordance with the procedure given in Example I natural rubber stocks were prepared from the following recipes:

|  | A | B | C | D |
|---|---|---|---|---|
| Pale crepe | 100 | 100 | 100 | 100 |
| Zinc oxide | 5 | 5 | 5 | 5 |
| Stearic acid | 3 | 3 | 3 | 3 |
| Carbon black (furnace HAF) | 50 | 50 | 50 | 50 |
| Antioxidant (high temperature reaction product of acetone and diphenyl amine) | 1 | 1 | 1 | 1 |
| 2-Benzothiazyl-N-morpholinyl disulfide | 1 | 1 | 1 | 1 |
| Styrene-sulfur polymer 1:4 | 1 | 3 | 5 | 12 |

The stocks A, B, C and D above were cured at 284°

F. for 80 minutes and the resulting vulcanizates had the following physical properties:

| | 300% Modulus, p.s.i. | Tensile, p.s.i. | Percent Elongation |
|---|---|---|---|
| A | 2,120 | 4,060 | 525 |
| B | 2,360 | 4,200 | 495 |
| C | 2,360 | 4,140 | 475 |
| D | 2,500 | 3,980 | 465 |

It is obvious that little difference in physical properties exists in the vulcanizates containing 1 and 12 parts of curing agent respectively.

*Example III*

A copolymer of about 25 weight percent of styrene and 75 weight percent butadiene was compounded according to the following recipes:

| | A | B | C |
|---|---|---|---|
| Styrene-butadiene copolymer | 100 | 100 | 100 |
| Zinc oxide | 5 | 5 | 5 |
| Stearic acid | 3 | 3 | 3 |
| Carbon black (HAF) | 50 | 50 | 50 |
| Antioxidant (high temperature reaction product of acetone and diphenyl amine) | 1 | 1 | 1 |
| 2-Benzothiazyl-N-morpholinyl disulfide | 1 | 1 | 1 |
| Styrene-sulfur polymer 1:4 | 3 | 4 | 6 |

The above stocks A, B and C were cured at 307° F. for 50 minutes yielding vulcanizates having the following physical properties:

| | 300% Modulus, p.s.i. | Tensile, p.s.i. | Percent Elongation |
|---|---|---|---|
| A | 2,440 | 3,970 | 435 |
| B | 2,870 | 4,000 | 395 |
| C | 3,710 | 3,960 | 315 |

*Example IV*

The styrene-butadiene copolymer described in Example III was compounded in the following recipes:

| | A | B | C |
|---|---|---|---|
| Styrene-butadiene copolymer | 100 | 100 | 100 |
| Zinc oxide | 5 | 5 | 5 |
| Stearic acid | 3 | 3 | 3 |
| Carbon black (HAF) | 50 | 50 | 50 |
| Antioxidant (high temperature reaction product of acetone and diphenyl amine) | 1 | 1 | 1 |
| Tetramethyl thiuram disulfide | 0.9 | | |
| Bis(2-benzothiazyl) disulfide | | 2.2 | |
| 2-Benzothiazyl-N-cyclohexyl sulfenamide | | | 1 |
| Styrene-sulfur polymer, 1:4 | 1.75 | 1.75 | 3 |

The stocks A, B and C were cured for 80 minutes at 307° F. to give vulcanizates having the following physical properties:

| | 300% Modulus, p.s.i. | Tensile, p.s.i. | Percent Elongation |
|---|---|---|---|
| A | 2,680 | 4,030 | 410 |
| B | 2,390 | 4,120 | 460 |
| C | 2,530 | 4,120 | 445 |

The above samples after aging at 212° F. in a test tube for 7 days had the following physical properties:

| | Tensile, p.s.i. | Percent Elongation |
|---|---|---|
| A | 2,560 | 290 |
| B | 3,260 | 290 |
| C | 3,480 | 255 |

*Example V*

An isobutylene-isoprene copolymer prepared from about 97 parts isobutylene and about 3 parts isoprene was compounded according to the following recipes:

Isobutylene-isoprene rubber _____ 100
Carbon black (FEF) _____ 60
Zinc oxide _____ 5
Stearic acid _____ 1
Tetramethylthiuram disulfide _____ 2
Antioxidant (high temperature reaction product of acetone and diphenyl amine) _____ 1
Styrene-sulfur polymer, 1:4 _____ 2

The above stock was cured at 320° F. for 40 minutes and the resulting vulcanizate had the following physical properties:

| 300% Modulus, p.s.i. | Tensile, p.s.i. | Percent Elongation |
|---|---|---|
| 1,180 | 1,570 | 510 |

*Example VI*

A substantially all cis-1,4 polyisoprene rubber was compounded according to the following recipe:

Cis-1,4-polyisoprene _____ 100
Zinc oxide _____ 5
Carbon black (HAF) _____ 45
Stearic acid _____ 3
Middle viscosity aromatic oil _____ 5
Lecithin _____ 1.5
Bis(2-benzothiazyl) disulfide _____ 0.6
Phenyl-beta-naphthylamine _____ 1.0
Styrene-sulfur polymer, 1:4 _____ 4

The above stock was cured at 293° F. for 120 minutes to give a vulcanizate having the following physical properties:

| 300% Modulus, p.s.i. | Tensile, p.s.i. | Percent Elongation |
|---|---|---|
| 1,020 | 2,840 | 525 |

*Example VII*

An essentially all cis-1,4-polybutadiene was compounded according to the following recipe:

Cis-1,4-polybutadiene _____ 100
Zinc oxide _____ 5
Carbon black (HAF) _____ 45
Stearic acid _____ 3
Medium viscosity aromatic oil _____ 5
Lecithin _____ 1.5
Bis(2-benzothiazyl) disulfide _____ 0.6
Phenyl-beta-naphthyl amine _____ 1.0
Styrene-sulfur polymer, 1:4 _____ 4

The above stock was cured at 243° F. for 60 minutes thus forming a vulcanizate having the following physical properties:

| 300% Modulus, p.s.i. | Tensile, p.s.i. | Percent Elongation |
|---|---|---|
| 1,270 | 2,880 | 510 |

*Example VIII*

A copolymer of about 33 parts of acrylonitrile and about 67 parts of butadiene was compounded with a styrene-sulfur polymer (A) and with elemental sulfur (B) according to the following recipes:

|  | A | B |
|---|---|---|
| Acrylonitrile-butadiene rubber | 100 | 100 |
| Zinc oxide | 5 | 5 |
| Phenyl-beta-naphthylamine | 1 | 1 |
| Stearic acid | 1 | 1 |
| Litharge | 1.25 | 1.25 |
| Carbon black (FEF) | 50 | 50 |
| High molecular weight polyether plasticizer | 20 | 20 |
| Salicyclic acid | 1.25 | 1.25 |
| Bis(2-benzothiazyl) disulfide | 2.5 | 1.5 |
| Styrene-sulfur polymer, 1:4 | 1.25 | |
| Sulfur | | 1.5 |

The above stocks were cured at 310° F. for 30 minutes to give vulcanizates having the following physical properties:

|  | 300% Modulus, p.s.i. | Tensile, p.s.i. | Percent Elongation |
|---|---|---|---|
| A | 1,800 | 2,940 | 495 |
| B | 1,720 | 2,430 | 405 |

Vulcanizates A and B after aging at 250° F. for 70 hours had the following physical properties:

|  | Tensile, p.s.i. | Percent Elongation |
|---|---|---|
| A | 2,780 | 330 |
| B | 1,800 | 170 |

*Example IX*

Sulfur-ethylene and sulfur-isobutylene polymers were each prepared by reacting 4 parts of sulfur and 1 part of the olefin at 140° C. for about 8–14 hours in an autoclave. The resulting fluid polymers were used as vulcanization agents with a styrene-butadiene polymer of the type described in Example III as follows:

| Styrene-butadiene copolymer | 100 |
|---|---|
| Zinc oxide | 5 |
| Stearic acid | 3 |
| HAF black | 50 |
| 2-benzothiazyl-N-cyclohexyl sulfenamide | 1 |
| Olefin-sulfur polymer | 4 |

Cured stocks prepared from the above recipes had the following physical properties:

| Sulfur-ethylene polymer recipe cured for 120' at 307° F. | | | Sulfur-isobutylene polymer recipe cured for 30' at 307° F. | | |
|---|---|---|---|---|---|
| 300% Modulus, p.s.i. | Tensile, p.s.i. | Percent Elongation | 300% Modulus, p.s.i. | Tensile, p.s.i. | Percent Elongation |
| 3,000 | 3,800 | 370 | 1,700 | 3,660 | 550 |

The styrene-alpha-methyl styrene-sulfur and styrene-dipentene-sulfur polymers as well as interpolymers of sulfur-propylene, sulfur-butene-1, sulfur-butene-2, sulfur-diisobutylene, sulfur-triisobutylene and sulfuralpha-methyl styrene all served equally well as vulcanization agents in the recipes described in the above examples.

We claim:

1. The composition comprising a major proportion of a rubber selected from the group consisting of natural and synthetic polyisoprenes, the polybutadienes, the polychloroprenes, copolymers of isobutylene and isoprene, copolymers of butadiene-1,3 and styrene and copolymers of butadiene-1,3 and acrylonitrile and from about 1 to 12% by weight based on the weight of said rubber of a curing agent comprising at least one interpolymer of sulfur and an olefinic hydrocarbon selected from the group consisting of styrene, alpha-methyl styrene, butene-1, butene-2, isobutylene, diisobutylene, triisobutylene, ethylene and propylene.

2. The cured composition of claim 1.

3. The cured composition comprising a major proportion of a rubbery material having available unsaturation selected from the group consisting of natural and synthetic polyisoprenes, the polybutadienes, the polychloroprenes, copolymers of isobutylene and isoprene, copolymers of butadiene-1,3 and styrene, and copolymers of butadiene-1,3 and acrylonitrile and from about 1 to about 4% by weight based on the weight of said rubbery material of an interpolymer of sulfur and at least one olefinic hydrocarbon selected from the group consisting of styrene, alpha-methyl styrene, butene-1, butene-2, isobutylene, diisobutylene, triisobutylene, ethylene and propylene.

4. The vulcanizate comprising a major proportion of a rubbery styrene-butadiene copolymer and from about 1 to about 4% by weight based on said styrene-butadiene copolymer of an interpolymer of sulfur and styrene containing from about 2 to about 5 atoms of sulfur per molecule of styrene.

5. The vulcanizate comprising a major proportion of a rubbery isobutylene-isoprene copolymer and from about 1 to about 4% by weight based on the weight of said copolymer of an interpolymer of sulfur and styrene containing from 2 to 5 atoms of sulfur per mole of styrene.

6. The vulcanizate comprising a major proportion of a substantially all cis-1,4-polyisoprene and from 1 to 4% by weight based on said polyisoprene of an interpolymer of sulfur and styrene containing from 2 to 5 atoms of sulfur per molecule of styrene.

7. The vulcanizate comprising a major proportion of a substantially all cis-1,4-polybutadiene and from 1 to 4% by weight of an interpolymer of sulfur and styrene containing from 2 to 5 atoms of sulfur per molecule of styrene.

8. The vulcanizate comprising a major proportion of a rubbery copolymer of butadiene and acrylonitrile and from 1 to 4% by weight of said copolymer of an interpolymer of sulfur and styrene containing from 2 to 5 atoms of sulfur per molecule of styrene.

9. The vulcanizate comprising a major proportion of a rubbery copolymer of butadiene and styrene and from 1 to 4% by weight based on the weight of said copolymer of an interpolymer of sulfur and ethylene containing from 2 to 5 atoms of sulfur per molecule of ethylene.

10. The vulcanizate comprising a major proportion of a rubbery copolymer of butadiene and styrene and from 1 to 4% by weight based on the weight of said copolymer of an interpolymer of sulfur and isobutylene containing from 2 to 5 atoms of sulfur per molecule of isobutylene.

11. The method for preparing a rubbery vulcanizate comprising mixing a major proportion of a rubbery material having available unsaturation selected from the group consisting of natural and synthetic polyisoprenes, the polybutadienes, the polychloroprenes, copolymers of isobutylene and isoprene, copolymers of butadiene-1,3 and styrene and copolymers of butadiene-1,3 and acrylonitrile with from about 1 to about 12% by weight based on the weight of said rubbery material of an interpolymer of sulfur and at least one olefinic hydrocarbon selected from the group consisting of styrene, alpha-methyl styrene, butene-1, butene-2, isobutylene, diisobutylene, triisobutylene, ethylene and propylene and curing the resulting mixture at a temperature of from about 250° to about 350° F.

12. The vulcanizable composition comprising a major proportion of a rubber having available unsaturation selected from the group consisting of natural and synthetic polyisoprenes, the polybutadienes, the polychloroprenes, copolymers of isobutylene and isoprene, copolymers of butadiene-1,3 and styrene and copolymers of butadiene-1,3 and acrylonitrile and from about 1 to about 12% by weight based on the weight of said rubber of an interpolymer of sulfur and at least one olefinic hydrocarbon selected from the group consisting of styrene, alpha-methyl styrene, butene-1, butene-2, isobutylene, diisobutylene, triisobutylene, ethylene and propylene said interpolymer containing from 2 to 5 sulfur atoms per olefinic hydrocarbon unit.

References Cited in the file of this patent

UNITED STATES PATENTS

| | | |
|---|---|---|
| 1,349,909 | Pratt | Aug. 17, 1920 |
| 2,411,275 | Kinneberg et al. | Nov. 19, 1946 |
| 2,806,843 | Welch | Sept. 17, 1957 |

OTHER REFERENCES

Baumann et al.: "Berichte," volume 28, Part I, pages 890–895 (1895).

Michael: "Berichte," volume 28, Part II, pages 1633–1637 (1895).

Meyer et al.: "Helvetica Chemica Acta," volume 18, pages 1061–1066 (1935).

UNITED STATES PATENT OFFICE
CERTIFICATE OF CORRECTION

Patent No. 2,989,513                      June 20, 1961

Charles Malcolm Hendry et al.

It is hereby certified that error appears in the above numbered patent requiring correction and that the said Letters Patent should read as corrected below.

Column 3, line 25, for "triolefin" read -- triolein --.

Signed and sealed this 23rd day of October 1962.

(SEAL)
Attest:

ERNEST W. SWIDER
Attesting Officer

DAVID L. LADD
Commissioner of Patents